United States Patent
Thompson et al.

[11] 3,883,327
[45] May 13, 1975

[54] METHOD AND APPARATUS FOR SEPARATING PARTICULATE MATTER FROM A GAS STREAM

[75] Inventors: Stanley P. Thompson; Walter T. Thompson; David L. Boyert, all of Topeka; Thomas B. Swearingen, Manhattan, all of Kans.

[73] Assignee: Thompson Dehydrating Company, Topeka, Kans.

[22] Filed: May 21, 1973

[21] Appl. No.: 362,440

[52] U.S. Cl. .................................. 55/94; 55/223
[51] Int. Cl. .............................................. B01d 47/06
[58] Field of Search .......... 34/75, 79; 55/84, 93, 94, 55/223, 257

[56] References Cited
UNITED STATES PATENTS

| | | | |
|---|---|---|---|
| 2,019,291 | 10/1935 | Brade et al. | 55/20 |
| 2,935,375 | 5/1960 | Boucher | 55/257 |
| 3,064,408 | 11/1962 | Erga et al. | 55/94 |
| 3,212,235 | 10/1965 | Markant | 55/94 |
| 3,601,900 | 8/1971 | Erisman et al. | 34/79 |
| 3,749,382 | 7/1973 | Thompson | 34/79 |
| 3,780,499 | 12/1973 | Dorr | 55/32 |

*Primary Examiner*—Charles N. Hart
*Attorney, Agent, or Firm*—Lowe, Kokjer, Kircher, Wharton & Bowman

[57] ABSTRACT

A method and apparatus for combining a particulate substance entrained in a gas stream with a substance initially present in the stream in a liquid state through controlled evaporation and recondensation of the liquid. The invention is particularly adapted for use in removing solid particle contaminants from a gas stream emanating from a dryer burning a combustible fuel. The relative volume of liquid vapor in the gas stream is maintained at a level of at least 20% to assure the presence of adequate vapor for agglomeration of particles and a relatively high saturation temperature. The gas stream, with the particles entrained therein, is passed through a first venturi wherein some initial agglomeration of particles occurs as a result of the increased mixing and liquid spray. In the diffuser section of the venturi the internal pressure of the gas stream begins to increase as the velocity decreases. Coupled with the diffuser section of the first venturi is a first frusto-conical member. As the gas stream enters the frusto-conical member the internal pressure will continue to increase until the differential between the liquid vapor pressure and the internal pressure of the gas stream is so great as to result in evaporation of the liquid. A second frusto-conical member is connected to the first member and as the gas stream enters this second member the internal pressure commences to decrease as the velocity increases. Thus, the internal pressure of the gas stream begins to approach the saturation pressure. Meanwhile, the temperature of the gas stream is being lowered through heat exchange with the walls of the members plus the liquid spray evaporation. A second venturi is coupled with the converging section of the second member and the pressure is lowered further as the gas stream enters the throat of this second venturi. The system is designed so as to approach saturation partial pressure of the gas stream liquid vapor component at the throat of the second venturi. Condensation of the liquid vapor occurs on the nuclei presented by the solid particles in the gas stream. The particles are also subjected to increased mixing in the throat of the second venturi further enhancing agglomeration. A slight increase in pressure and temperature again occurs in the diffuser section of the second venturi. The increase is not sufficient to again evaporate the absorbed liquid, however. The gas stream containing the high moisture content agglomerated particles, preconditioned for separation, may now be conveyed to a separator. The separated particles may be returned to a primary collector or to the dryer along with a stratum of the gas stream for use as the material conveying medium.

17 Claims, 3 Drawing Figures

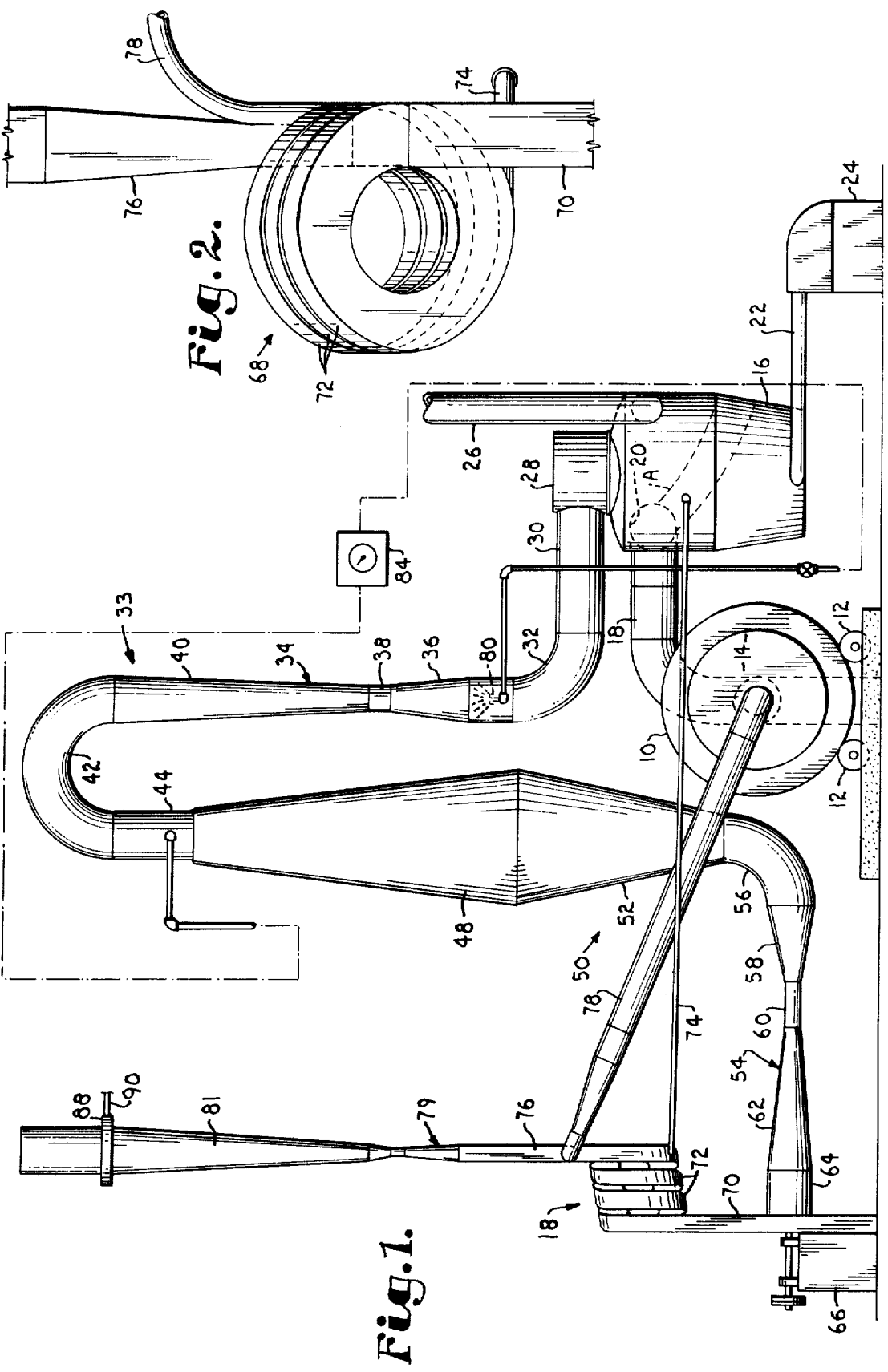

3,883,327

METHOD AND APPARATUS FOR SEPARATING PARTICULATE MATTER FROM A GAS STREAM

This invention relates generally to a method and apparatus for combining a particulate substance with a substance initially present in a liquid state and, more particularly, to such a method and apparatus which is adapted for use in removing particulate matter from a gas stream.

Air pollution control legislation has imposed an ever increasing burden upon various industries to reduce pollution of the atmosphere by gas stream effluents. In many instances the harmful contaminants in a gas stream are solid particles which are entrained in the stream as a result of some physical or chemical process.

It is also well known to introduce a water stream into a gas stream to remove solid particle contaminants by effectively "washing" them from the gas. These so called "scrubbers" are only partially effective since very small particles entrained in a gas stream cannot be removed efficiently by a scrubbing process.

The present invention is effective in removing solid particles of even a very minute size from a gas stream by effectively building up the particle size until the particle can be removed by mechanical separation. The invention is also applicable to physically bringing together two substances "in solution" for purposes other than separation of particulate matter from a gas stream.

It is therefore an object of the present invention to provide a method and apparatus for combining a particulate substance entrained in a fluid stream with a substance initially present in the stream in a liquid state through evaporation of the liquid and recondensation in intimate contact with the particulate substance.

As a corollary to the above object, an aim of the invention is to achieve evaporation and recondensation without interrupting the flow of the fluid stream by gradually increasing the pressure differential between the liquid and the fluid stream through gradually increasing the cross-sectional area of the stream until vaporization occurs.

As another corollary to the object second above, an objective of this invention is to achieve recondensation of the liquid without interrupting the flow of the fluid stream by decreasing the internal pressure of the stream through gradually decreasing the cross-sectional area of the fluid stream.

Another important object of the present invention is to provide a method and apparatus for removing solid particle contaminants from a gas stream which is highly effective in removing the smallest most particles as a result of agglomeration of the particles through controlled evaporation of water and recondensation of the water vapor utilizing the particles as condensation nuclei.

As a corollary to the above object, an aim of this invention is to increase agglomeration of particles in a gas stream to the maximum extent possible prior to removal of the particles from the stream by passing the gas stream through zones of increased velocity and turbulence both prior and subsequent to the evaporation-recondensation procedure.

Another corollary to the object second above is to prevent precipitation of particles and water while agglomeration of the particles is taking place and prior to introduction of the particles into a centrifugal separator by maintaining the internal pressure of the gas stream as well as the temperature slightly above saturation temperature and pressure until just before introduction of the particles into a separator.

Still another one of the objectives of this invention is to provide a method and apparatus for removing solid particles from the effluent stream of a dryer by increasing the size of the solid particles and which includes an effective way of returning the separated particles for recycling through the system while also returning a stratum of the gas stream to the dryer for use as the conveying medium for the material being dried to thereby reduce burning of the material.

These and other objects of the invention will be more fully understood and will become apparent from the description, claims and drawings, wherein:

FIG. 1 is a partially schematic elevational view of the apparatus of the present invention coupled with a rotatable drying drum to effectively remove solid particles from the effluent emanating from the drum;

FIG. 2 is an enlarged elevational view of the centrifugal separator which forms a part of the present invention.

Figure 3:
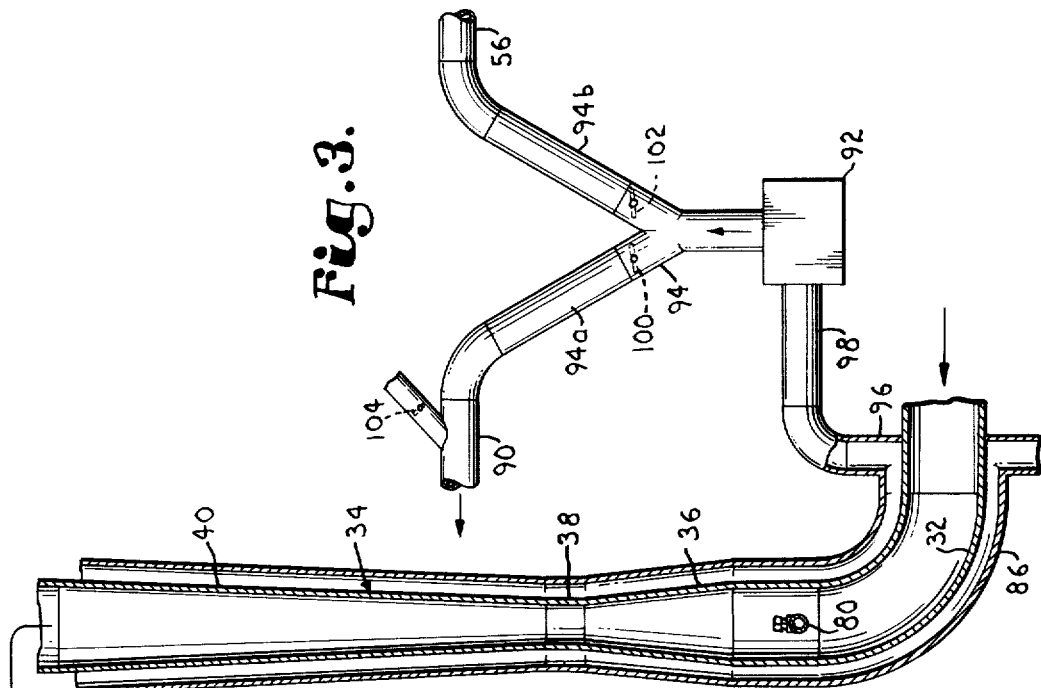
FIG. 3 is an enlarged vertical cross-sectional view of a portion of the apparatus shown in FIG. 1, FIG. 3 being partially schematic for purposes of illustration.

Referring initially to FIG. 1, the end of an elongated cylindrical dehydrating drum designated by the numeral 10 can be seen. A dehydrating drum of this type and its associated furnace and blower fan is more fully described in U.S. Pat. No. 3,593,430 entitled "Crop Dehydrator" which issued July 29, 1971 and is incorporated herein by reference to the extent necessary to obtain a complete and full understanding of the present invention. Drum 10 is mounted for rotation upon appropriate rollers 12, two of which are visible in FIG. 1. An appropriate prime mover (not shown) is coupled with drum 10 to continually rotate it during the drying operation. A frusto-conical furnace 14 is disposed at one end of drum 10 along with appropriate blower means (not shown) for introducing hot drying gases into the dehydrator drum. An appropriate material inlet (not shown) for introducing the material to be dried is normally disposed at the end of drum 10 immediately beneath furnace 14.

The material to be dried is pneumatically conveyed through drum 10 with the aid of appropriate flighting (not shown) within the drum and a second blower (not shown) at the end of drum 10 opposite furnace 14. This second blower also conveys the dried material into a flat bottomed primary collector 16 via a conduit 18. The dried material enters collector 16 through an inlet 20 disposed tangentially of the side wall of collector 16 and the path of travel of the dried material into the collector is outlined by broken lines designated by the letters A and B in FIG. 1.

Separated and dried material is withdrawn from collector 16 via a conduit 22 to a hammer mill 24 where it is comminuted and then advanced to subsequent processing steps such as pelletizing or the like. Duct 26 at the right hand side of collector 16 returns "fines" from these subsequent processing steps to the collector.

Collector 16 also includes a centrally disposed stack 28 at its top through which the products of combustion and conveying gases from drum 10 pass. A length of ductwork 30 and an elbow 32 convey the gases from stack 28 to a first conduit structure designated generally by the numeral 33. Structure 33 includes a first venturi 34 having a converging section 36, a throat section 38, and a diverging section 40. Structure 33 further includes an elbow 42 and a short straight section of ductwork 44 which couple the end of diverging section 40 with a first frusto-conical member 48 that diverges in the direction of travel of a gas stream through the structure.

A second conduit structure designated generally by the numeral 50 is coupled with first conduit structure 33 at the end of member 48. Structure 50 comprises a second frusto-conical member 52 disposed in abutting relationship to the first member 48 and a second venturi designated generally by the numeral 54. Venturi 54 is coupled with member 52 through an elbow 56 and comprises a converging section 58, a throat section 60 and a diverging section 62. It is to be noted that the angles of divergence and convergence of members 48 and 52 are considerably greater than the corresponding angles for the diverging and converging sections of venturis 34 and 54. From a common horizontal reference plane, converging sections of venturis 34 and 54 will extend at an angle of approximately 30° while the diverging sections will extend at an angle of approximately 10°. Member 48 has a corresponding angle of divergence of approximately 19° and member 50 has an angle of convergence of approximately 30°.

A final section of ductwork 64 couples the second conduit structure 50 with the inlet to a blower fan 66. Blower fan 66 is designed to maintain a negative pressure throughout conduits 33 and 50. In some instances, however, it may be desirable to replace blower fan 66 with a positive pressure fan for conveying the gas stream through the conduits.

As the gases pass out of blower fan 66 they are directed to a centrifugal separator designated generally by the numeral 68 through a conduit 70. Separator 68 comprises a plurality of convolutions 72 within which any particles in the gas stream are subjected to substantial centrifugal forces. Extending tangentially from the side wall of the final convolution is a return conduit 74 through which heavier particles in the gas stream are returned to collector 16. To this end, it is to be noted that the inlet of conduit 74 into collector 16 is positioned within the path of material flow into the collector from inlet 20.

As best illustrated in FIG. 2, the final convolution 72 of separator 68 merges into a linear conduit section 76 which extends upwardly and away from the separator. A short distance above separator 68 conduit 76 divides into a return line 78. Line 78 conveys a stratum of gas back to drum 10 for use as the medium for conveying a material to be dried through the drum. This is explained more fully in copending application Ser. No. 135,068 entitled "Crop Dehydrator and Method" by one of the present coapplicants, which application was allowed on Aug. 24, 1972.

Conduit 76 extends upwardly past line 78 to a third venturi 79 which may be used for volumetric measurements on the exhaust gases. Finally, an upwardly extending stack 81 is coupled with venturi 79 for directing the gases to the required height above ground level before exhausting them to the atmosphere.

A first water nozzle 80 is disposed immediately ahead of first venturi 34 and a second group of water nozzles 82 are located at the forwardmost end of frusto-conical member 48. The two nozzles are interconnected through a common humidistat control 84 of a type well known to those skilled in the art. Control 84, manifestly, is coupled with appropriate source of water. It will be noted from viewing FIG. 3 that both conduit structures 33 and 50 are surrounded by a shrouded 86 up to the throat section 60 of venturi 54. Shroud 86 provides an air space between its inner wall and the outer walls of the conduit structures, which air space may be utilized as an insulator or for a heat exchanger with the conduit structures.

Shroud 86 extends along the entire length of elbow 32, structure 33, structure 50 and round venturi 54. The shroud structure 86 further continues around separator 68 and past venturi 79 along the length of stack 81. As seen from viewing FIG. 1, shroud 86 terminates at the upper end of stack 81 and a manifold 88 to which is coupled a return line 90. Again referring to FIG. 3, return line 90 is coupled with a blower fan 92 through a Y-juncture 94. Blower fan 92 is also coupled with the shroud structure 86 at the opposite end of the ladder through a second manifold 96 and a conduit 98.

As indicated by the arrows in FIG. 3, fan 92 draws air from the airspace defined by structure 86 and directs it through one of two legs 94a and 94b of junction 94. The first leg 94a is connected with return line 90 as previously described and the second leg 94b is connected with a conduit 96 that is coupled with line 78 through appropriate structure (not shown). First and second dampers 100 and 102 are located in legs 94a and 94b. During periods of operation when the atmospheric temperature is relatively cold and insulation is needed to maintain the operating temperature of the system at the desired level, damper 102 is closed and damper 100 opened to continually recirculate the warmed air through shroud structure 86. On the other hand, when some degree of cooling within structure 86 is desired, damper 102 may be opened to recycle a portion of the heated air back through line 78 to comprise a portion of the conveying medium as will be discussed in further detail hereinafter. A third damper 104 is opened to allow outside air to enter line 100 and effect some cooling within shroud 86. Manifestly, intermediate positions for the dampers 100, 102 and 104 where a portion of the air is recycled through leg 94a and a portion directed through leg 94b can also be accommodated. To this end, a common control circuit (not shown) may be employed to operate the three dampers.

The method and apparatus of the present invention will find application in many situations where it is desirable to remove a particulate substance from a gas stream. It is particularly applicable, however, to the removal of solid particles from the effluent of a dehydrator for drying a forage crop such as alfalfa where a great percentage of the solid particles are of very small size and the particles are highly hygroscopic. The crop to be dried is introduced into dehydrating drum 10 and pneumatically conveyed through the rotating drum, with the aid of flighting in the drum, using recycled stack gases returned through line 78 to comprise the conveying medium. The dried material is then introduced into collector 16 where the major portion of it is separated from the gas stream and moved on to hammer mill 24 for subsequent processing steps. The gas stream effluent with many minute particles entrained therein rises and passes out of collector 16 through stack 28. The particles in the gas stream are too small for removal by conventional scrubbing techniques or centrifugal separators.

The temperature of the gas stream as it leaves collector 16 will normally be approximately 250° F. It is desirable to prevent a great temperature drop until the gas stream enters the second frusto-conical member 52 so that the temperature of the gas will remain relatively high minimizing the amount of heat required to achieve evaporation. On the other hand, some gradual cooling of the gas stream is desired to approach saturation temperature as the gas stream moves through the second conduit structure 50. To this end, depending upon the environment in which the apparatus is operated, the air space between the outer wall of the conduit structures and shroud 86 may be employed for heat exchange or insulating purposes. It is desirable to maintain the temperature of the gas stream within the range of 5°–20° F. above the saturation temperature until the gas stream approaches member 52.

In furtherance of the objective of maintaining a relatively high saturation temperature for the gas stream, the volume of liquid vapor in the stream should comprise 20–70% of the total volume. Depending upon atmospheric conditions, humidistat control 84 is designed to maintain this relative volume of vapor by introducing the same as required through one or both nozzles 80 and 82.

As the gas stream enters converging section 36 the cross-sectional area of the stream is gradually and uniformly decreased to thereby increase the velocity of the gas stream with a corresponding decrease in internal pressure. Venturi 34 is designed so that a pressure drop of approximately 10 inches of water column occurs between the entrance to section 36 and the entrance to throat section 38. Manifestly, the greatly increased velocity of the gas stream will result in increased mixing within the throat section 38. This will commence agglomeration of the particles within the gas stream as the very small particles behave essentially as a gas and are greatly accelerated while the larger particles will move at a relatively constant rate. The result is to increase the number of collisions between small and large particles with a resulting buildup in particle size. The pressure drop through this venturi should not be so great as to result in such a high degree of acceleration as to cause colliding particles to "fly apart" rather than agglomerate.

As the gas stream leaves throat section 38 and enters diverging section 40 the cross-sectional area of the gas stream is gradually and uniformly increased thereby decreasing the velocity and increasing the internal pressure. Also, as the gas stream moves through section 40 and the remainder of conduits 33 and 50 some reduction in temperature will occur as a result of heat exchange with the side walls of the conduit structures.

As the gas stream passes through elbow 42 the temperature will have been reduced to approximately 200° F. and this temperature is maintained relatively constant through member 48 to be within the range of 10°–20° F. above the saturation temperature as previously specified.

As the gas stream enters member 48 its velocity has been substantially reduced allowing the rate of increase in the cross-sectional area of the gas stream to be advanced without danger of stalling. Thus, the cross-sectional area is further increased in member 48 with a corresponding decrease in velocity and increase in internal pressure. By the time the gas stream reaches the end of member 48 the velocity will desirably have been reduced by a factor of tenfold.

The first conduit structure 33 which terminates with the end of member 48 is designed to bring about an increase in the internal pressure of the gas stream of a magnitude such that the pressure differential between the gas stream and the vapor pressure of the liquid entrained therein will cause vaporization of the liquid. This occurs in frusto-conical member 48 and immediately thereafter the gas stream enters member 52 where the cross-sectional area of the gas stream is uniformly and gradually decreased with a corresponding increase in velocity and decrease in internal pressure. This increase in velocity and decrease in internal pressure continues on through the converging section of venturi 54. Simultaneously with this decrease in internal pressure a decrease in temperature is also occurring as a result of further heat exchange of the gas stream with the side walls of second conduit structure 50.

Ideally, the temperature and pressure will be reduced to saturation conditions as the gas stream enters throat section 60 of the second venturi. Since that portion of the gas stream which is in contact with the side walls of the conduit structure will normally be at a slightly lower temperature than the central portion of the stream, it is not necessary to reduce the temperature to the theoretical saturation level for the entire stream. The condensation which occurs at the outer edges of the gas stream will spread through the entire stream as a result of the increased turbulence in the throat section 60.

Condensation will commence at precisely the point in time when saturation temperature and pressure are reached by any portion of the gas stream as a result of the presence of the minute solid particles which present condensation nuclei for the vaporized liquid. Inherently, as condensation occurs the vapor will precipitate out other particles onto the condensation nuclei thus building up particle size. Furthermore, since essentially every particle entrained in the gas stream serves as a nucleus for condensation much more thorough wetting of the particles occurs than with heretofore used techniques. This also enhances buildup of particle size.

The greatly increased velocity of the gas stream within the throat section 60 again causes increased turbulence at the same time condensation is occurring. This is still another substantial factor in causing further agglomeration of the particles to increase their size to the desired level. Again, it is desirable to have a pressure drop from the inlet to section 58 to the inlet of throat section 60 of approximately 10 inches of water column. This will provide for a velocity increase sufficient to cause the desired agglomeration of particles yet below the level which would cause the particles to break apart as the result of the increased turbulence.

Because of the highly hygroscopic nature of particles such as the fines from an alfalfa dehydrator most of the condensed vapor will be absorbed by the particles and will therefore not remain in the fluid stream. This also allows the temperature and pressure of the stream to be increased slightly above the saturation temperature and pressure subsequent to condensation to facilitate further handling. This occurs in section 62 of venturi 54 as the cross-sectional area of the gas stream is again gradually and uniformly increased prior to entering blower fan 66. With the temperature and pressure of the gas stream slightly above the saturation level, precipitation on the side of the conduit structure and associated ductwork is minimized.

As the gas stream with the agglomerated particles is introduced into separator 68 the particles are subjected to substantial centrifugal forces as they follow the path of convolutions 72. Manifestly, the heavy agglomerated particles will move to a stratum of the gas stream along the outer wall of the separator and return conduit 74 extends tangentially from the outer wall to return this stratum to collector 16. As previously mentioned, the inlet of conduit 74 to collector 16 is disposed within the path of travel of dried material entering the collector. Since collector 16 is operated at a negative pressure any unabsorbed liquid vapor in the stratum of the gas stream returned through conduit 74 will be immediately liquified upon entering the negative pressure chamber. By introducing the returned stratum into the path of material coming into the collector any condensed liquid will be quickly absorbed by the dry material which will also have a "wiping" effect on the conduit inlet thus assuring that the inlet is not plugged up by overly wet particles.

A second stratum of the remaining gas stream is returned to drum 10 through return line 78 as previously described. While the major portion of agglomerated particles will be returned to primary collector 16 through conduit 74, line 78 offers a second opportunity to return any particles which were not included in the stratum passing through conduit 74. A volumetric measurement of the exhaust gases and any solid particles remaining therein may be taken at the third venturi 79 prior to the gases passing out through stack 81.

Present regulations of the Environmental Protection Agency applicable to alfalfa dehydrating plants require that solid atmospheric pollutants be held to no greater than 25% per ton of alfalfa being dehydrated. Using the method and apparatus of the present invention a reduction of 79% below the permissible level has been achieved in actual test results.

While the invention has been particularly described with reference to removing solid particles from the gas stream effluent of a crop dehydrator, it will be appreciated that it has applications to many other industrial processes where a solid particulate substance is desired to be combined with a substance initially present in a liquid state. In this regard, it is to be understood that the term "particulate substance" as used in this application is intended to include substances other than solids. For example, the method and apparatus of the present invention could also be used to combine two liquids or a liquid and a vapor of substantially varying vapor pressures. The first liquid would comprise the particulate substance and could be moved in a fluid stream according to the teachings of the present invention. The second liquid, having a substantially lower vapor pressure, would also be present in the fluid stream and would be vaporized according to the teachings of the present invention. The two liquids would then be combined as the second liquid is condensed around the condensation nuclei formed by the first liquid. This application of the invention would find utilization in processes where intimate mixing or solution of one substance in another is desired.

Having thus described the invention, what is claimed as new and desired to be secured by Letters Patent is:

1. A method of combining a particulate substance with a substance which is initially present in a liquid state, said method comprising the steps of:
   moving the particulate substance in a fluid stream;
   providing a quantity of said liquid substance in the fluid stream;
   progressively decreasing the internal fluid stream pressure to thereby increase the velocity of the particles of said substance to effect agglomeration of the particles;
   maintaining the temperature and pressure of the fluid stream during said progressively decreasing step, above the saturation point so as to preclude condensation of liquid during agglomeration of the particles;
   progressively increasing the internal fluid stream pressure to effect vaporization of said liquid substance; and
   progressively reducing the internal pressure of said fluid stream to effect condensation of the vapor on the agglomerated particles.

2. A method as set forth in claim 1, wherein the step of progressively increasing the internal pressure comprises increasing the cross-sectional area of the fluid stream whereby to decrease the velocity of the stream.

3. A method as set forth in claim 2, wherein the step of progressively reducing internal pressure comprises decreasing the cross-sectional area of the fluid stream whereby to increase the velocity of the stream.

4. A method as set forth in claim 1, wherein is included the step of progressively reducing the temperature simultaneous with reducing the internal pressure.

5. A method as set forth in claim 4, wherein said moving step further comprises again accelerating said fluid stream subsequent to progressively increasing the internal pressure whereby to increase the turbulence in the stream and cause further agglomeration of the particles.

6. A method as set forth in claim 5, wherein is included, during the step of progressively increasing the internal pressure, the step of maintaining the temperature within the range of 5° to 20° F. above the saturation temperature of the vapor, and the step of progressively reducing the temperature and internal pressure comprises controlling the temperature and internal pressure to effect condensation simultaneously with the step of again accelerating the fluid stream.

7. A method as set forth in claim 6, wherein is included, subsequent to the step of again accelerating said fluid stream, the step of increasing the internal pressure and temperature to a level above the saturation temperature of the vapor whereby to facilitate additional movement of the fluid stream.

8. A method as set forth in claim 7, wherein said particulate substance comprises a solid and said liquid substance comprises water, and including the additional and subsequent steps of directing the fluid stream along a circuitous path to subject the agglomerated particles to centrifugal forces whereby to achieve stratification of said particles and the remainder of the fluid stream; and separating the stratum comprising said particles from the remainder of the fluid stream.

9. A method as set forth in claim 1, wherein said fluid stream comprises stack gas from a dryer utilizing a combustible fuel source, said particulate substance comprises a hygroscopic solid, said liquid substance comprises water, and wherein is included the step of maintaining the relative volume of water in the fluid stream within the range of 20 to 70%.

10. A method as set forth in claim 9, wherein the step of maintaining the relative water volume comprises introducing a quantity of water into the fluid stream.

11. A method as set forth in claim 9, wherein said particulate substance comprises a solid and said liquid substance comprises water, and including the additional and subsequent steps of directing the fluid stream along a circuitous path to subject the agglomerated particles to centrifugal forces whereby to achieve stratification of said particles and the remainder of the fluid stream; and separating the stratum comprising said particles from the remainder of the fluid stream; and directing a portion of the separated fluid stream to the dryer inlet for use as the conveying medium to pneumatically convey a material to be dried through the dryer.

12. A method as set forth in claim 11, wherein a primary collector is provided for receiving dried material from the dryer, and including the step of directing the separated stratum comprising said particles to said primary collector.

13. A method as set forth in claim 12, wherein the step of directing the separated stratum comprises directing the stratum into the path of material entering said primary collector.

14. Apparatus for combining a solid particulate matter entrained in the stack gas of a dryer utilizing a combustable fuel with water to remove the solid matter from the gas stream said apparatus comprising:

means for confining said fluid stream;

first conduit structure coupled with said confining means and having a first converging section and a second diverging section, said converging section comprising converging sidewalls extending in the direction of travel of the fluid stream whereby to decrease the internal fluid stream pressure and effect agglomeration of the particles without causing the fluid stream to reach its saturation point, said diverging section comprising diverging sidewalls extending in the direction of travel of the fluid stream whereby to increase the internal fluid stream pressure to a level to effect vaporization of said liquid; and second conduit structure coupled with said first structure and having uniformly converging sidewalls extending in the direction of travel of the fluid stream whereby to decrease the internal pressure of the fluid stream to a level to cause condensation of said vapor on the agglomerated particles of said substance;

a centrifugal separator coupled with the second conduit structure for achieving stratification between the particles and the remainder of the fluid stream; and third conduit means for returning a portion of the remainder of the fluid stream to the dryer inlet for use as the medium for conveying a material through the dryer.

15. The invention of claim 14, said second conduit structure comprising a second frusto-conical member and a venturi coupled with the converging end of said member.

16. The invention of claim 14, wherein is included means for maintaining the relative water volume within the fluid stream within the range of 20 to 70%.

17. The invention of claim 16, wherein the product from the dryer is introduced into a primary collector, and including conduit means for conveying the separated stratum comprising said particulate matter to said collector.

* * * * *